(12) United States Patent
Zatorski et al.

(10) Patent No.: US 11,988,099 B2
(45) Date of Patent: May 21, 2024

(54) UNDUCTED THRUST PRODUCING SYSTEM ARCHITECTURE

(71) Applicant: General Electric Company, Schenectady, NY (US)

(72) Inventors: Darek Tomasz Zatorski, Fort Wright, KY (US); Jeffrey Hamel, Mainville, OH (US); Andrew Breeze-Stringfellow, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/900,407

(22) Filed: Jun. 12, 2020

(65) Prior Publication Data

US 2020/0308979 A1 Oct. 1, 2020

Related U.S. Application Data

(63) Continuation of application No. 14/438,006, filed as application No. PCT/US2013/066392 on Oct. 23, 2013, now Pat. No. 10,704,410.

(Continued)

(51) Int. Cl.
*B64C 11/00* (2006.01)
*B64C 11/18* (2006.01)
(Continued)

(52) U.S. Cl.
CPC ............ *F01D 17/16* (2013.01); *B64C 11/001* (2013.01); *B64C 11/18* (2013.01); *B64C 11/46* (2013.01);
(Continued)

(58) Field of Classification Search
CPC ....... B64C 11/00; B64C 11/008; B64C 11/04; B64C 11/06; B64C 11/30; B64C 11/46;
(Continued)

(56) References Cited

U.S. PATENT DOCUMENTS 2,006,805 A * 7/1935 Gwinn, Jr. .............. B64C 11/00
244/69
2,262,854 A * 11/1941 Morris .................... B64C 11/00
415/208.1

(Continued)

FOREIGN PATENT DOCUMENTS

CN 1204005 A 1/1996
CN 1900508 1/2007
(Continued)

OTHER PUBLICATIONS

English Language Canadian Office Action dated Aug. 23, 2018.
(Continued)

*Primary Examiner* — Justin D Seabe
*Assistant Examiner* — Behnoush Haghighian
(74) *Attorney, Agent, or Firm* — Fitch, Even, Tabin & Flannery, LLP

(57) ABSTRACT

An unducted thrust producing system, includes a rotating element, a stationary element. An inlet may be located forward or aft of the rotating element and the stationary element. An exhaust may be located forward, aft, or between the rotating element and the stationary element.

12 Claims, 13 Drawing Sheets

Related U.S. Application Data

(60) Provisional application No. 61/771,314, filed on Mar. 1, 2013, provisional application No. 61/717,451, filed on Oct. 23, 2012, provisional application No. 61/717,445, filed on Oct. 23, 2012.

(51) Int. Cl.
  B64C 11/46 (2006.01)
  B64C 11/48 (2006.01)
  F01D 9/02 (2006.01)
  F01D 17/16 (2006.01)
  F02C 6/20 (2006.01)
  F02K 1/46 (2006.01)
  F02K 3/02 (2006.01)
  B64D 27/00 (2006.01)

(52) U.S. Cl.
  CPC ............... B64C 11/48 (2013.01); F01D 9/02 (2013.01); F02C 6/206 (2013.01); F02K 1/46 (2013.01); F02K 3/025 (2013.01); B64C 11/00 (2013.01); B64D 2027/005 (2013.01); F05B 2240/12 (2013.01); F05B 2260/96 (2013.01); F05D 2220/324 (2013.01); F05D 2220/325 (2013.01); F05D 2250/30 (2013.01); F05D 2250/51 (2013.01); F05D 2250/52 (2013.01); F05D 2260/14 (2013.01); Y02E 10/72 (2013.01); Y02T 50/60 (2013.01)

(58) Field of Classification Search
  CPC ......... B64C 11/48; B64D 27/10; B64D 27/12; B64D 27/14; B64D 33/02; B64D 2033/0253; B64D 2033/0293; B64D 2027/005; F01D 17/10; F01D 17/105; F01D 17/12; F01D 17/14; F01D 17/16; F01D 17/162; F02K 3/025; F04D 25/02; F04D 25/028; F02C 6/206
  See application file for complete search history.

(56) References Cited

U.S. PATENT DOCUMENTS

| | | | |
|---|---|---|---|
| 2,620,122 A | 12/1952 | Curry | |
| 2,913,055 A | 11/1959 | Quick | |
| 2,999,630 A | 9/1961 | Warren et al. | |
| 3,972,646 A | 8/1976 | Brown | |
| 4,171,183 A | 10/1979 | Cornell | |
| 4,370,097 A | 1/1983 | Hanson | |
| 4,446,696 A * | 5/1984 | Sargisson | F02K 3/077 60/226.3 |
| 4,486,146 A * | 12/1984 | Campion | B64C 11/48 416/129 |
| 4,569,199 A | 2/1986 | Klees et al. | |
| 4,607,657 A | 8/1986 | Hirschkron | |
| D286,880 S | 11/1986 | Smith, Jr. | |
| 4,784,575 A | 11/1988 | Nelson et al. | |
| 4,796,424 A | 1/1989 | Farrar et al. | |
| 4,815,273 A * | 3/1989 | Rudolph | F02K 3/072 416/171 |
| 4,817,382 A * | 4/1989 | Rudolph | F02C 3/10 416/129 |
| 4,907,946 A | 3/1990 | Ciokajlo et al. | |
| 4,936,748 A * | 6/1990 | Adamson | F02C 6/206 416/129 |
| 5,054,998 A | 10/1991 | Davenport | |
| 5,190,441 A * | 3/1993 | Murphy | F02K 3/072 416/201 A |
| 5,197,855 A * | 3/1993 | Magliozzi | B64C 11/00 415/185 |
| 5,209,642 A | 5/1993 | Larimer et al. | |
| 5,259,187 A | 11/1993 | Dunbar et al. | |
| 5,345,760 A * | 9/1994 | Giffin, III | F04D 19/028 415/199.5 |
| 5,457,346 A | 10/1995 | Blumberg et al. | |
| 5,950,308 A | 9/1999 | Koff et al. | |
| 6,547,518 B1 | 4/2003 | Czachor et al. | |
| 6,792,758 B2 | 9/2004 | Dowman | |
| 6,905,303 B2 | 6/2005 | Liu | |
| 7,047,167 B2 | 5/2006 | Yamaguchi | |
| 7,726,935 B2 * | 6/2010 | Johnson | F03D 1/04 415/4.5 |
| 7,762,766 B2 | 7/2010 | Shteyman et al. | |
| 8,221,081 B2 | 7/2012 | Lebrun | |
| 8,251,308 B2 * | 8/2012 | Choi | B64C 39/028 244/6 |
| 8,371,105 B2 * | 2/2013 | Glynn | F02C 6/206 60/268 |
| 8,382,430 B2 | 2/2013 | Parry et al. | |
| 8,459,035 B2 | 6/2013 | Smith | |
| 8,701,380 B2 * | 4/2014 | Vuillemin | B64C 11/48 60/39.15 |
| 8,762,766 B2 | 6/2014 | Ferguson et al. | |
| 8,834,119 B2 * | 9/2014 | Balk | B63H 3/082 416/129 |
| 9,017,028 B2 * | 4/2015 | Fabre | F01D 1/26 416/129 |
| 9,091,207 B2 * | 7/2015 | Chanez | F02C 7/05 |
| 9,217,391 B2 * | 12/2015 | Gallet | F02K 3/062 |
| 9,242,721 B2 * | 1/2016 | Neuteboom | B64C 11/00 |
| 9,593,582 B2 * | 3/2017 | Dejeu | F02C 3/10 |
| 9,683,547 B2 * | 6/2017 | Kim | F03D 15/00 |
| 9,951,651 B2 * | 4/2018 | Frantz | F01D 17/16 |
| 10,119,409 B2 * | 11/2018 | Charier | F04D 29/362 |
| 10,202,865 B2 | 2/2019 | Breeze-Stringfellow et al. | |
| 10,370,976 B2 | 8/2019 | Quach | |
| 10,399,664 B2 * | 9/2019 | Bowden | F02C 6/206 |
| 10,414,486 B2 | 9/2019 | Wood | |
| 10,669,881 B2 | 6/2020 | Breeze-Stringfellow et al. | |
| 10,704,410 B2 | 7/2020 | Zatorski | |
| 10,907,495 B2 | 2/2021 | Breeze-Stringfellow | |
| 11,300,003 B2 | 4/2022 | Breeze-Stringfellow | |
| 2004/0197187 A1 | 10/2004 | Usab et al. | |
| 2004/0234372 A1 | 11/2004 | Shahpar | |
| 2004/0265124 A1 * | 12/2004 | Liu | F01D 5/26 415/211.2 |
| 2006/0186261 A1 * | 8/2006 | Unzicker | B64C 11/001 244/12.1 |
| 2007/0272796 A1 | 11/2007 | Stuhr | |
| 2008/0098719 A1 | 5/2008 | Addis | |
| 2008/0166242 A1 * | 7/2008 | Johnson | F03D 1/04 416/245 R |
| 2009/0078819 A1 | 3/2009 | Guering et al. | |
| 2010/0014977 A1 * | 1/2010 | Shattuck | B64C 11/16 416/155 |
| 2010/0111674 A1 | 5/2010 | Sparks | |
| 2010/0124500 A1 * | 5/2010 | Lebrun | B64C 11/18 416/128 |
| 2010/0212285 A1 | 8/2010 | Negulescu | |
| 2011/0044796 A1 | 2/2011 | Hussain | |
| 2011/0150659 A1 | 6/2011 | Micheli et al. | |
| 2011/0192166 A1 | 8/2011 | Mulcaire | |
| 2012/0079808 A1 * | 4/2012 | Glynn | F02C 6/206 60/268 |
| 2012/0177493 A1 * | 7/2012 | Fabre | B64C 11/308 416/129 |
| 2012/0207594 A1 * | 8/2012 | Chanez | F02K 3/062 415/208.1 |
| 2012/1022239 | 9/2012 | Smith | |
| 2012/0315141 A1 * | 12/2012 | Udall | F02K 1/48 416/94 |
| 2013/0104522 A1 | 5/2013 | Kupratis | |
| 2013/0315701 A1 * | 11/2013 | Neuteboom | F01D 9/041 415/209.1 |
| 2014/0017086 A1 * | 1/2014 | Charier | F04D 29/185 416/128 |
| 2014/0133982 A1 * | 5/2014 | Dejeu | B64C 11/18 416/223 R |

(56) References Cited

U.S. PATENT DOCUMENTS

| | | | |
|---|---|---|---|
| 2015/0003993 A1* | 1/2015 | Kim | F03D 15/00 |
| | | | 416/235 |
| 2015/0098813 A1 | 4/2015 | Jarrett, Jr. et al. | |
| 2015/0147178 A1* | 5/2015 | Frantz | B64C 11/306 |
| | | | 416/164 |
| 2015/0284070 A1 | 10/2015 | Breeze-Stringfellow | |
| 2015/0291276 A1 | 10/2015 | Zatorski | |
| 2016/0010487 A1 | 1/2016 | Breeze-Stringfellow | |
| 2016/0333729 A1* | 11/2016 | Miller | F02K 3/04 |
| 2016/0333734 A1* | 11/2016 | Bowden | F01D 9/041 |
| 2017/0102006 A1 | 4/2017 | Miller et al. | |
| 2019/0136710 A1 | 5/2019 | Breeze-Stringfellow | |
| 2020/0271010 A1 | 8/2020 | Breeze-Stringfellow | |
| 2021/0108597 A1* | 4/2021 | Ostdiek | F02C 3/067 |

FOREIGN PATENT DOCUMENTS

| | | |
|---|---|---|
| CN | 101657607 A | 2/2010 |
| CN | 101978150 | 2/2011 |
| CN | 102216158 | 10/2011 |
| CN | 102361792 | 2/2012 |
| EP | 0385913 A1 | 9/1990 |
| EP | 0887259 A2 | 12/1998 |
| EP | 1493900 A2 | 1/2005 |
| EP | 2562082 A2 | 2/2013 |
| EP | 3093443 A1 | 11/2016 |
| FR | 2962109 | 1/2012 |
| GB | 2100799 A | 1/1983 |
| GB | 2145774 | 4/1985 |
| GB | 2196390 A | 4/1988 |
| GB | 2211247 A | 6/1989 |
| GB | 2461811 A | 1/2010 |
| JP | S5760999 | 4/1982 |
| JP | S63105240 A | 5/1988 |
| JP | 2700734 B2 | 1/1998 |
| JP | 0370698 A | 5/2006 |
| JP | 2006123880 | 5/2006 |
| JP | 2008082243 | 4/2008 |
| JP | 2009508748 A | 3/2009 |
| JP | 2011-527263 A | 10/2011 |
| KR | 101179277 B1 | 9/2012 |
| WO | 2003029644 | 4/2003 |
| WO | 2004033295 A1 | 4/2004 |
| WO | 2005111413 A1 | 11/2005 |
| WO | 2011020458 A2 | 2/2011 |
| WO | 2011094477 A2 | 8/2011 |
| WO | 2011107320 A1 | 9/2011 |

OTHER PUBLICATIONS

Machine translation and a Japanese Office Action issued in connection with corresponding JP Application No. 2015538158 dated Jul. 3, 2018.

Machine translation and a Notification of Reasons for Refusal issued in connection with corresponding JP Application No. 2015-538158 dated Sep. 5, 2017.

Non-Final Rejection towards related U.S. Appl. No. 14/437,872 dated Jun. 1, 2017.

A Canadian Office Action issued in connection with corresponding CA Application No. 2887262 dated Feb. 2, 2017.

Canadian Office Action issued in connection with corresponding CA Application No. 2887262 dated Mar. 11, 2016.

Theodorsen, The Theory of Propellers:, NACA (National Advisory Committee for Aeronautics) pp. 1-53, 1944.

Crigler, "Application of Theodorsen's Theory to Propeller Design", NACA (National Advisory Committee for Aeronautics) Rep. 924, pp. 83-99, 1948.

Smith, "Unducted Fan Aerodynamic Design", Turbomachinery, vol. No. 109, Issue No. 03, pp. 313-324, 1987.

Yamamoto et al., "Numerical Calculation of Propfan/Swirl Recovery Vane Flow Field", 28th Joint Propulsion Conference And Exhibit, pp. 1-8, Jul. 6-8, 1992.

PCT Search Report and Written Opinion issued in connection with corresponding PCT Application No. PCT/US2013/066403 dated Feb. 25, 2014.

PCT Search Report and Written Opinion issued in connection with corresponding PCT Application No. PCT/US2013/066383 dated Apr. 15, 2014.

Unofficial English Translation of Chinese Office Action issued in connection with corresponding CN Application No. 201380055486.2 dated Oct. 9, 2015.

International Search Report dated Jun. 4, 2014 which was issued in connection with PCT Patent Application No. PCT/US13/066392 which was filed on Oct. 23, 2013.

European Office Action issued in connection with related EP Application No. 16192167.1 dated Feb. 9, 2017.

Unofficial English Translation of Chinese Office Action issued in connection with corresponding CN Application No. 201380055512.1 dated Jan. 12, 2016.

Craig, M.K., et al., Engine architecture with reverse rotation integral drive and vaneless turbine, GE Co-Pending U.S. Appl. No. 61/754,086, filed Jan. 18, 2013.

Non-Final Rejection towards related U.S. Appl. No. 14/438,006 dated Jul. 25, 2017.

* cited by examiner

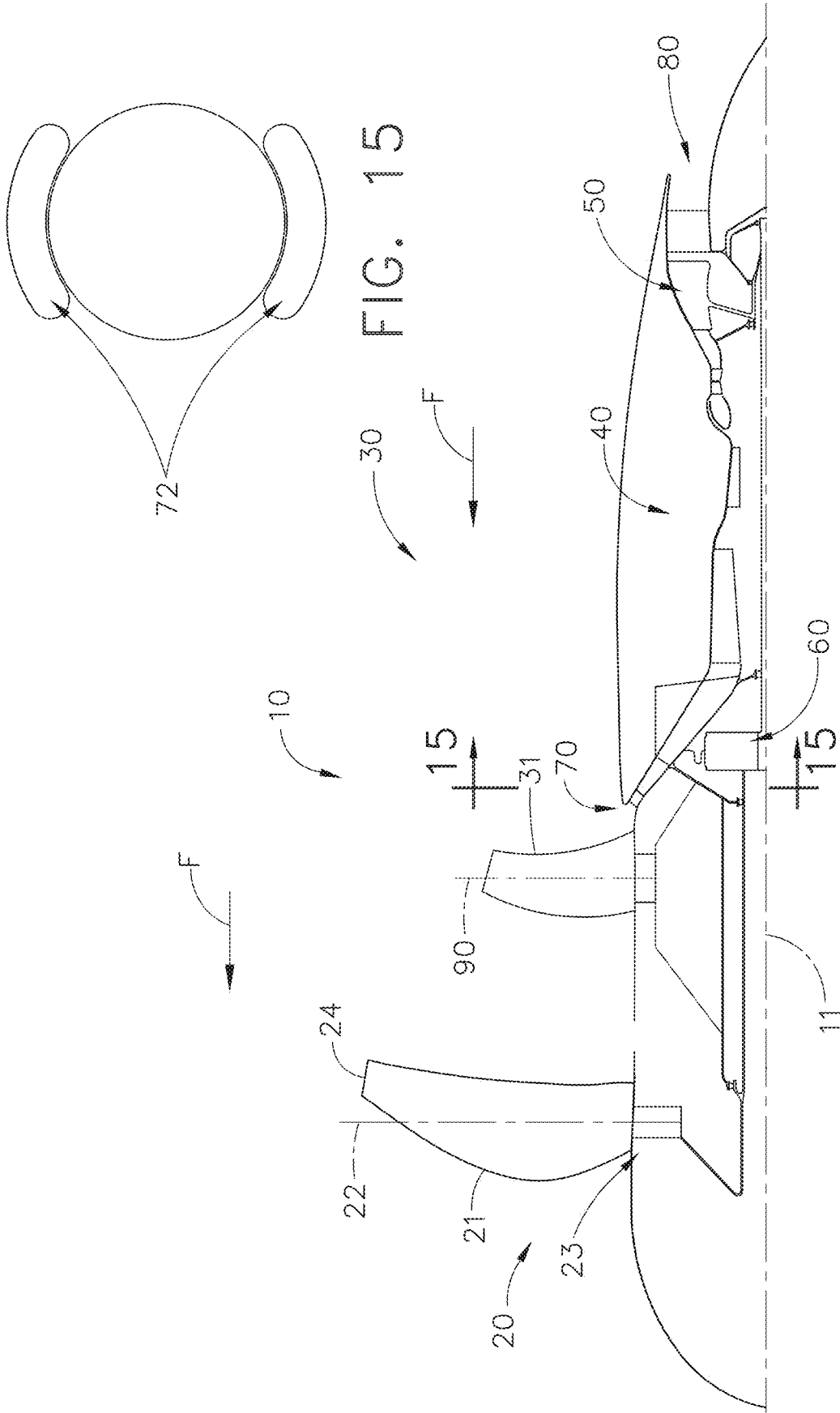

UNDUCTED THRUST PRODUCING SYSTEM ARCHITECTURE

This application is a divisional of U.S. patent application Ser. No. 14/438,006, filed on Apr. 23, 2015, which is a national stage application under 35 U.S.C. § 371(c) of prior-filed, PCT application serial number PCT/US2013/066392, filed on Oct. 23, 2013, which claims priority to Provisional Patent Application Ser. No. 61/717,445 filed Oct. 23, 2012 and titled "PROPULSION SYSTEM ARCHITECTURE", and is related to PCT application serial number PCT/US2013/066383, titled "UNDUCTED THRUST PRODUCING SYSTEM" filed on Oct. 23, 2013, and PCT application serial number PCT/US2013/066403, titled "VANE ASSEMBLY FOR AN UNDUCTED THRUST PRODUCING SYSTEM" filed on Oct. 23, 2013. All of the above listed applications are herein incorporated by reference.

BACKGROUND OF THE INVENTION

The technology described herein relates to an unducted thrust producing system, particularly architectures for such systems. The technology is of particular benefit when applied to "open rotor" gas turbine engines.

Gas turbine engines employing an open rotor design architecture are known. A turbofan engine operates on the principle that a central gas turbine core drives a bypass fan, the fan being located at a radial location between a nacelle of the engine and the engine core. An open rotor engine instead operates on the principle of having the bypass fan located outside of the engine nacelle. This permits the use of larger fan blades able to act upon a larger volume of air than for a turbofan engine, and thereby improves propulsive efficiency over conventional engine designs.

Optimum performance has been found with an open rotor design having a fan provided by two contra-rotating rotor assemblies, each rotor assembly carrying an array of airfoil blades located outside the engine nacelle. As used herein, "contra-rotational relationship" means that the blades of the first and second rotor assemblies are arranged to rotate in opposing directions to each other. Typically the blades of the first and second rotor assemblies are arranged to rotate about a common axis in opposing directions, and are axially spaced apart along that axis. For example, the respective blades of the first rotor assembly and second rotor assembly may be co-axially mounted and spaced apart, with the blades of the first rotor assembly configured to rotate clockwise about the axis and the blades of the second rotor assembly configured to rotate counter-clockwise about the axis (or vice versa). In appearance, the fan blades of an open rotor engine resemble the propeller blades of a conventional turboprop engine.

The use of contra-rotating rotor assemblies provides technical challenges in transmitting power from the power turbine to drive the blades of the respective two rotor assemblies in opposing directions.

It would be desirable to provide an open rotor propulsion system utilizing a single rotating propeller assembly analogous to a traditional bypass fan which reduces the complexity of the design, yet yields a level of propulsive efficiency comparable to contra-rotating propulsion designs with a significant weight and length reduction.

BRIEF DESCRIPTION OF THE INVENTION

An unducted thrust producing system has a rotating element with an axis of rotation and a stationary element. The rotating element includes a plurality of blades, and the stationary element has a plurality of vanes configured to impart a change in tangential velocity of the working fluid opposite to that imparted by the rotating element acted upon by the rotating element.

According to one aspect of the technology described herein, an unducted thrust producing system includes a rotating element, a stationary element, and an inlet forward of the rotating element and the stationary element.

According to another aspect of the technology described herein, an unducted thrust producing system includes a rotating element, a stationary element, and a nonannular inlet aft of both elements.

According to another aspect of the technology described herein, an unducted thrust producing system includes a rotating element and a stationary element, wherein the rotating element is driven via a speed reduction device, wherein: the speed reduction device is located forward of both rotating and stationary elements; or the speed reduction device located between the rotating element and a trailing edge of the stationary element.

According to another aspect of the technology described herein, an unducted thrust producing system includes a rotating element, a stationary element, and an exhaust, wherein: the exhaust is located forward of the rotating and stationary elements; or the exhaust is located between the rotating element and the stationary element; or the exhaust is located aft of the rotating element and the stationary element.

According to another aspect of the technology described herein, an unducted thrust producing system includes a plurality of rotating and stationary elements, wherein at least one rotating element rotates in an opposite direction to at least one other rotating element, and wherein the span of the stationary elements are at least 25% the span of the rotating elements.

According to another aspect of the technology described herein, an unducted thrust producing system includes a rotating element, a stationary element, and a gas turbine engine comprising a core, the core having a low pressure turbine and a booster, wherein the rotating element is driven by the low pressure turbine via a speed reduction device, and wherein: the booster is driven via the intermediate pressure turbine directly coupled with the booster; or the booster is driven by the low pressure turbine directly coupled with the booster.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 14 is a cross-sectional schematic illustration of another exemplary embodiment of an unducted thrust producing system; and FIG. 15 is a cross-sectional schematic illustration taken along lines 15-15 of FIG. 14 illustrating the inlet configuration of the unducted thrust producing system of FIG. 14.

DETAILED DESCRIPTION OF THE INVENTION

Figure 1:
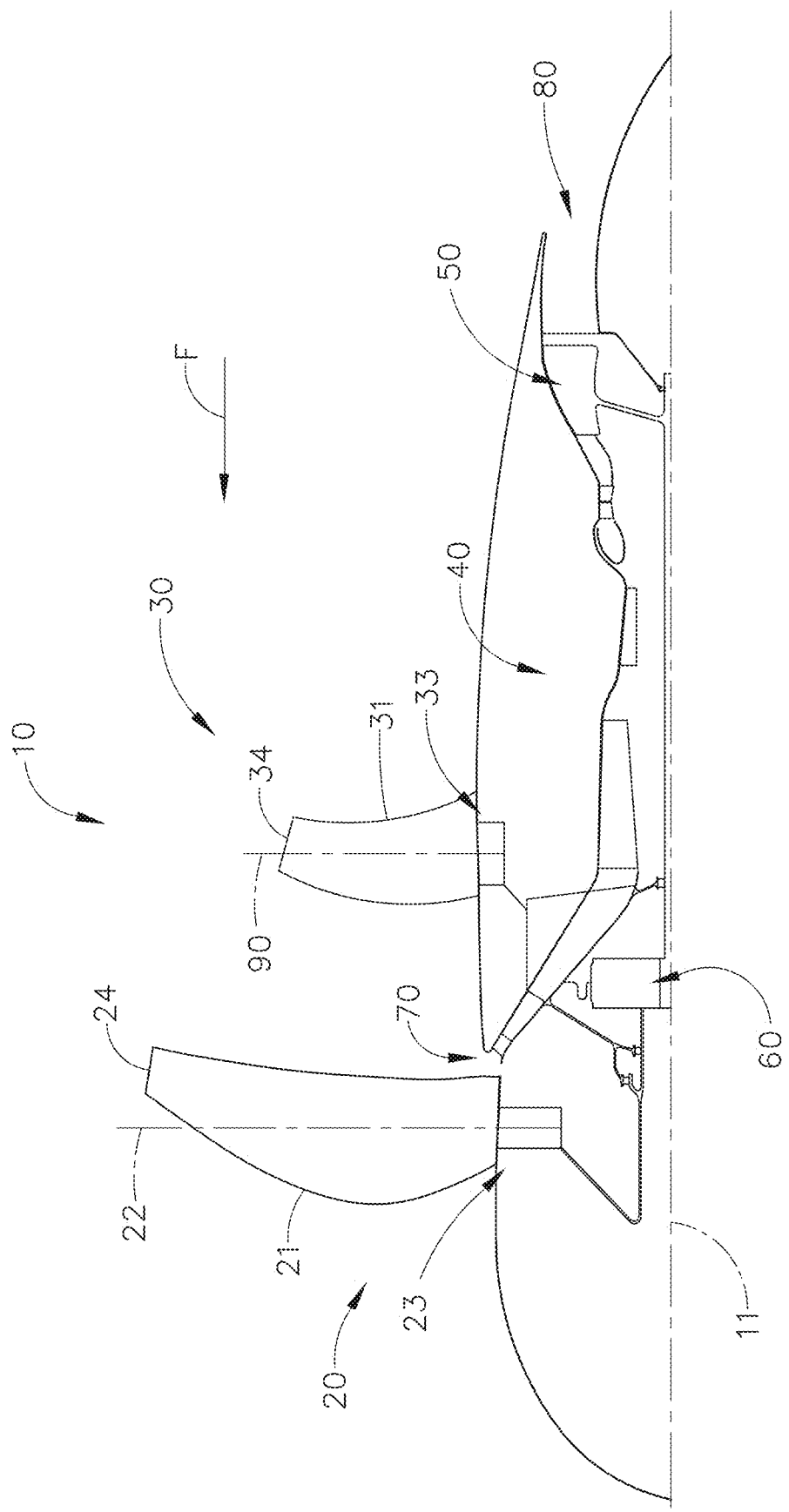
FIG. 1 is a cross-sectional schematic illustration of an exemplary embodiment of an unducted thrust producing system.

In all of the Figures which follow, like reference numerals are utilized to refer to like elements throughout the various embodiments depicted in the Figures.

Figure 3:
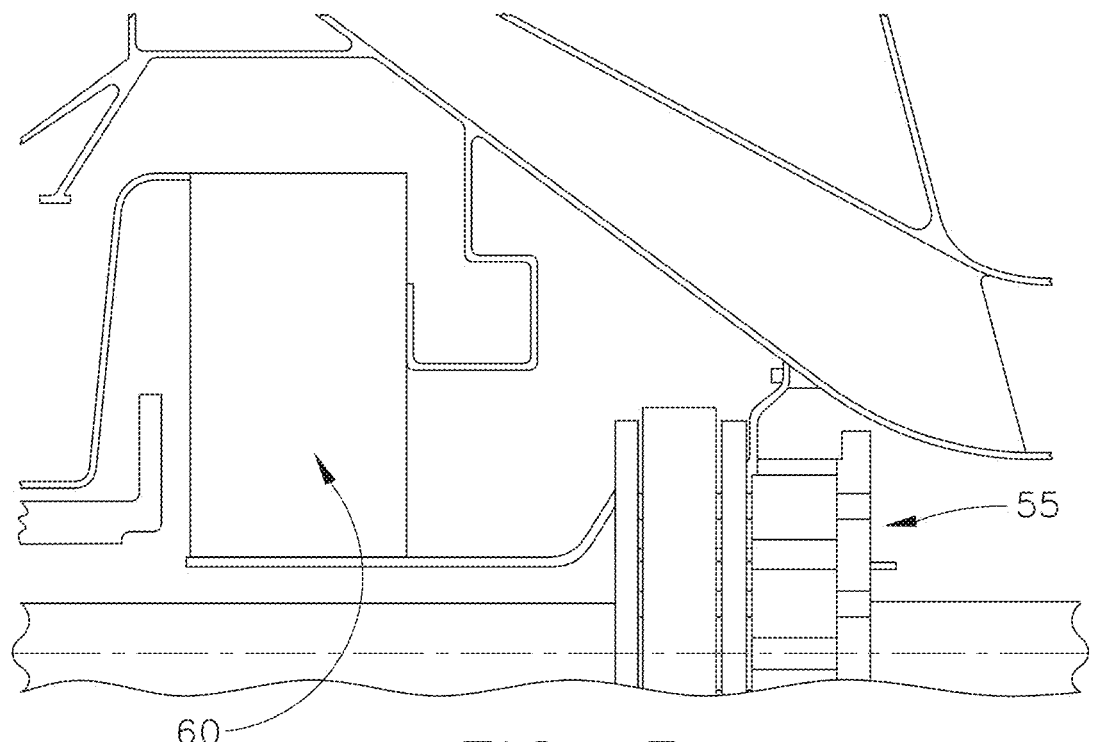
FIG. 3 is a partial cross-sectional schematic illustration of an exemplary embodiment of an unducted thrust producing system depicting an exemplary compound gearbox configuration.
Figure 4:
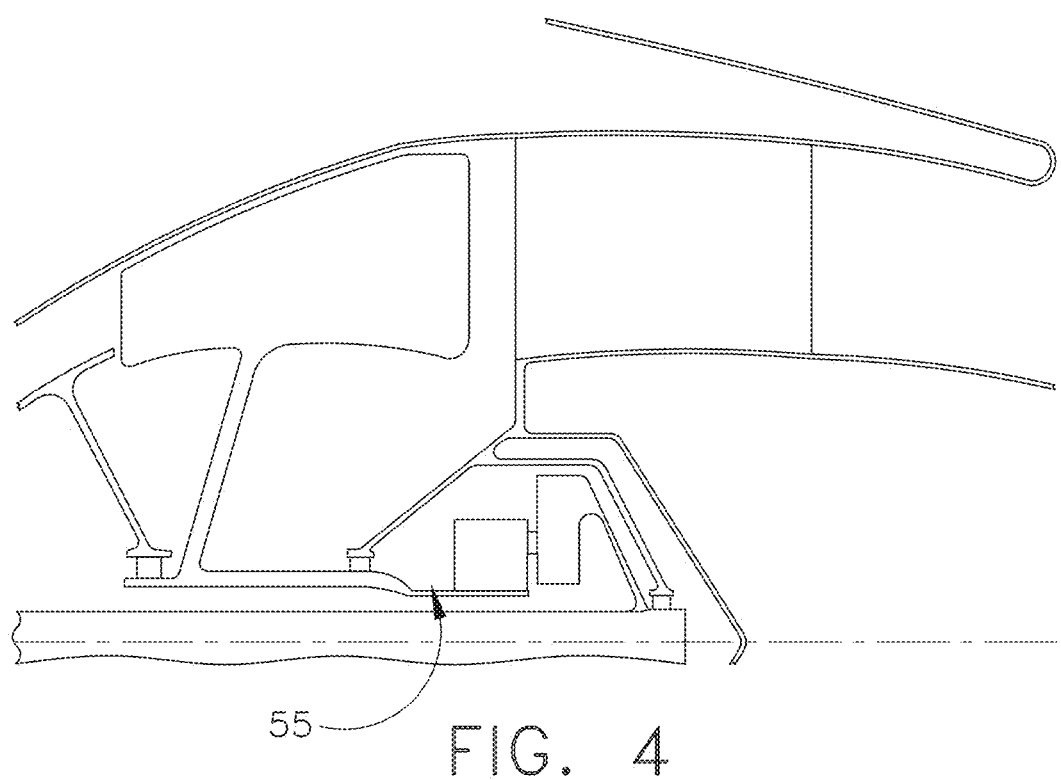
FIG. 4 is a partial cross-sectional schematic illustration of an exemplary embodiment of an unducted thrust producing system depicting another exemplary gearbox configuration.

FIG. 1 shows an elevational cross-sectional view of an exemplary embodiment of an unducted thrust producing system 10. As is seen from FIG. 1, the unducted thrust producing system 10 takes the form of an open rotor propulsion system and has a rotating element 20 depicted as a propeller assembly which includes an array of airfoil blades 21 around a central longitudinal axis 11 of the unducted thrust producing system 10. Blades 21 are arranged in typically equally spaced relation around the centerline 11, and each blade 21 has a root 23 and a tip 24 and a span defined therebetween. Unducted thrust producing system 10 includes a gas turbine engine having a gas generator 40 and a low pressure turbine 50. Left- or right-handed engine configurations can be achieved by mirroring the airfoils of 21, 31, and 50. As an alternative, an optional reversing gearbox 55 (located in or behind the low pressure turbine 50 as shown in FIGS. 3 and 4 or combined or associated with power gearbox 60 as shown in FIG. 3) permits a common gas generator and low pressure turbine to be used to rotate the fan blades either clockwise or counterclockwise, i.e., to provide either left- or right-handed configurations, as desired, such as to provide a pair of oppositely-rotating engine assemblies as may be desired for certain aircraft installations. Unducted thrust producing system 10 in the embodiment shown in FIG. 1 also includes an integral drive (power gearbox) 60 which may include a gearset for decreasing the rotational speed of the propeller assembly relative to the low pressure turbine 50.

Figure 2:
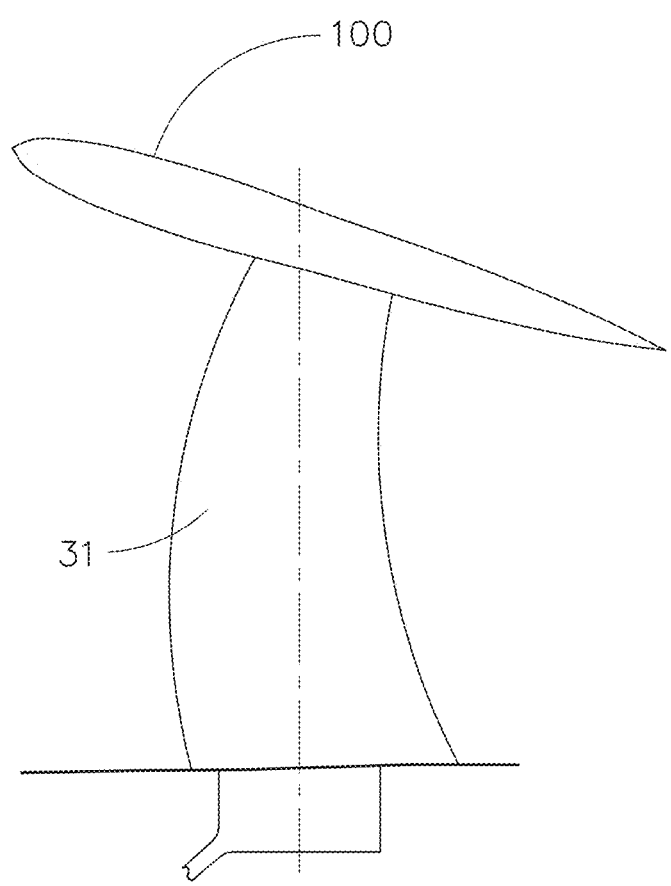
FIG. 2 is an illustration of an alternative embodiment of an exemplary vane assembly for an unducted thrust producing system.

Unducted thrust producing system 10 also includes in the exemplary embodiment a non-rotating stationary element 30 which includes an array of vanes 31 also disposed around central axis 11, and each blade 31 has a root 33 and a tip 34 and a span defined therebetween. These vanes may be arranged such that they are not all equidistant from the rotating assembly, and may optionally include an annular shroud or duct 100 distally from axis 11 (as shown in FIG. 2) or may be unshrouded. These vanes are mounted to a stationary frame and do not rotate relative to the central axis 11, but may include a mechanism for adjusting their orientation relative to their axis 90 and/or relative to the blades 21. For reference purposes, FIG. 1 also depicts a Forward direction denoted with arrow F, which in turn defines the forward and aft portions of the system. As shown in FIG. 1, the rotating element 20 is located forward of the gas generator 40 in a "puller" configuration, and the exhaust 80 is located aft of the stationary element 30.

In addition to the noise reduction benefit, the duct 100 shown in FIG. 2 provides a benefit for vibratory response and structural integrity of the stationary vanes 31 by coupling them into an assembly forming an annular ring or one or more circumferential sectors, i.e., segments forming portions of an annular ring linking two or more vanes 31 such as pairs forming doublets. The duct 100 may allow the pitch of the vanes to be varied as desired.

A significant, perhaps even dominant, portion of the noise generated by the disclosed fan concept is associated with the interaction between wakes and turbulent flow generated by the upstream blade-row and its acceleration and impingement on the downstream blade-row surfaces. By introducing a partial duct acting as a shroud over the stationary vanes, the noise generated at the vane surface can be shielded to effectively create a shadow zone in the far field thereby reducing overall annoyance. As the duct is increased in axial length, the efficiency of acoustic radiation through the duct is further affected by the phenomenon of acoustic cut-off, which can be employed, as it is for conventional aircraft engines, to limit the sound radiating into the far-field. Furthermore, the introduction of the shroud allows for the opportunity to integrate acoustic treatment as it is currently done for conventional aircraft engines to attenuate sound as it reflects or otherwise interacts with the liner. By introducing acoustically treated surfaces on both the interior side of the shroud and the hub surfaces upstream and downstream of the stationary vanes, multiple reflections of acoustic waves emanating from the stationary vanes can be substantially attenuated.

In operation, the rotating blades 21 are driven by the low pressure turbine via gearbox 60 such that they rotate around the axis 11 and generate thrust to propel the unducted thrust producing system 10, and hence an aircraft to which it is associated, in the forward direction F.

It may be desirable that either or both of the sets of blades 21 and 31 incorporate a pitch change mechanism such that the blades can be rotated with respect to an axis of pitch rotation either independently or in conjunction with one another. Such pitch change can be utilized to vary thrust and/or swirl effects under various operating conditions, including to provide a thrust reversing feature which may be useful in certain operating conditions such as upon landing an aircraft.

Blades 31 are sized, shaped, and configured to impart a counteracting swirl to the fluid so that in a downstream direction aft of both rows of blades the fluid has a greatly reduced degree of swirl, which translates to an increased level of induced efficiency. Blades 31 may have a shorter span than blades 21, as shown in FIG. 1, for example, 50% of the span of blades 21, or may have longer span or the same span as blades 21 as desired. Vanes 31 may be attached to an aircraft structure associated with the propulsion system, as shown in FIG. 1, or another aircraft structure such as a wing, pylon, or fuselage. Vanes 31 of the stationary element may be fewer or greater in number than, or the same in number as, the number of blades 21 of the rotating element and typically greater than two, or greater than four, in number.

In the embodiment shown in FIG. 1, an annular 360 degree inlet 70 is located between the fan blade assembly 20 and the fixed or stationary blade assembly 30, and provides a path for incoming atmospheric air to enter the gas generator 40 radially inwardly of the stationary element 30. Such a location may be advantageous for a variety of reasons, including management of icing performance as well as protecting the inlet 70 from various objects and materials as may be encountered in operation.

Figure 5:
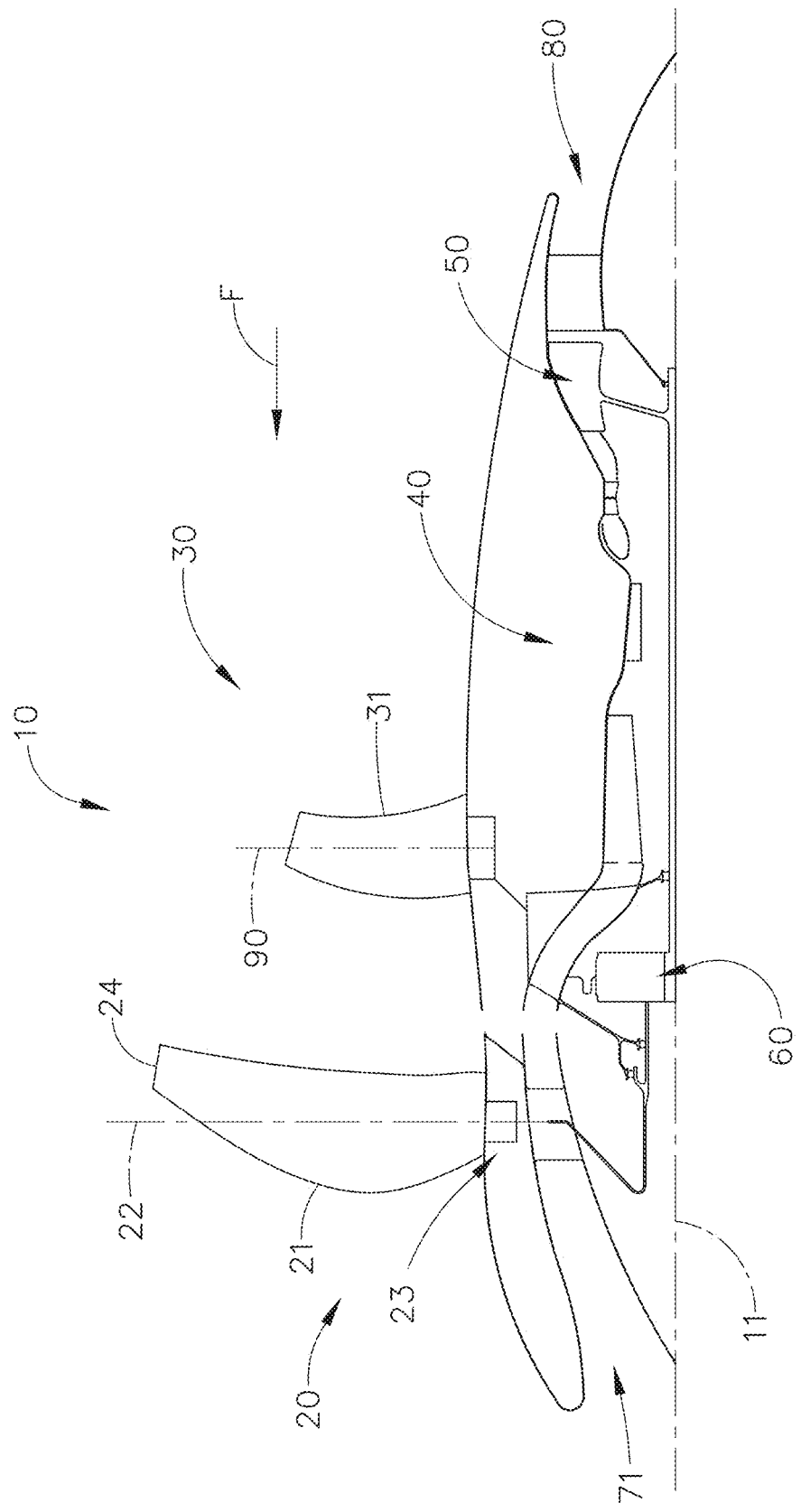
FIG. 5 is a cross-sectional schematic illustration of another exemplary embodiment of an unducted thrust producing system.

FIG. 5 illustrates another exemplary embodiment of a gas turbine engine 10, differing from the embodiment of FIG. 1 in the location of the inlet 71 forward of both the rotating element 20 and the stationary element 30 and radially inwardly of the rotating element 20.

Figure 6:
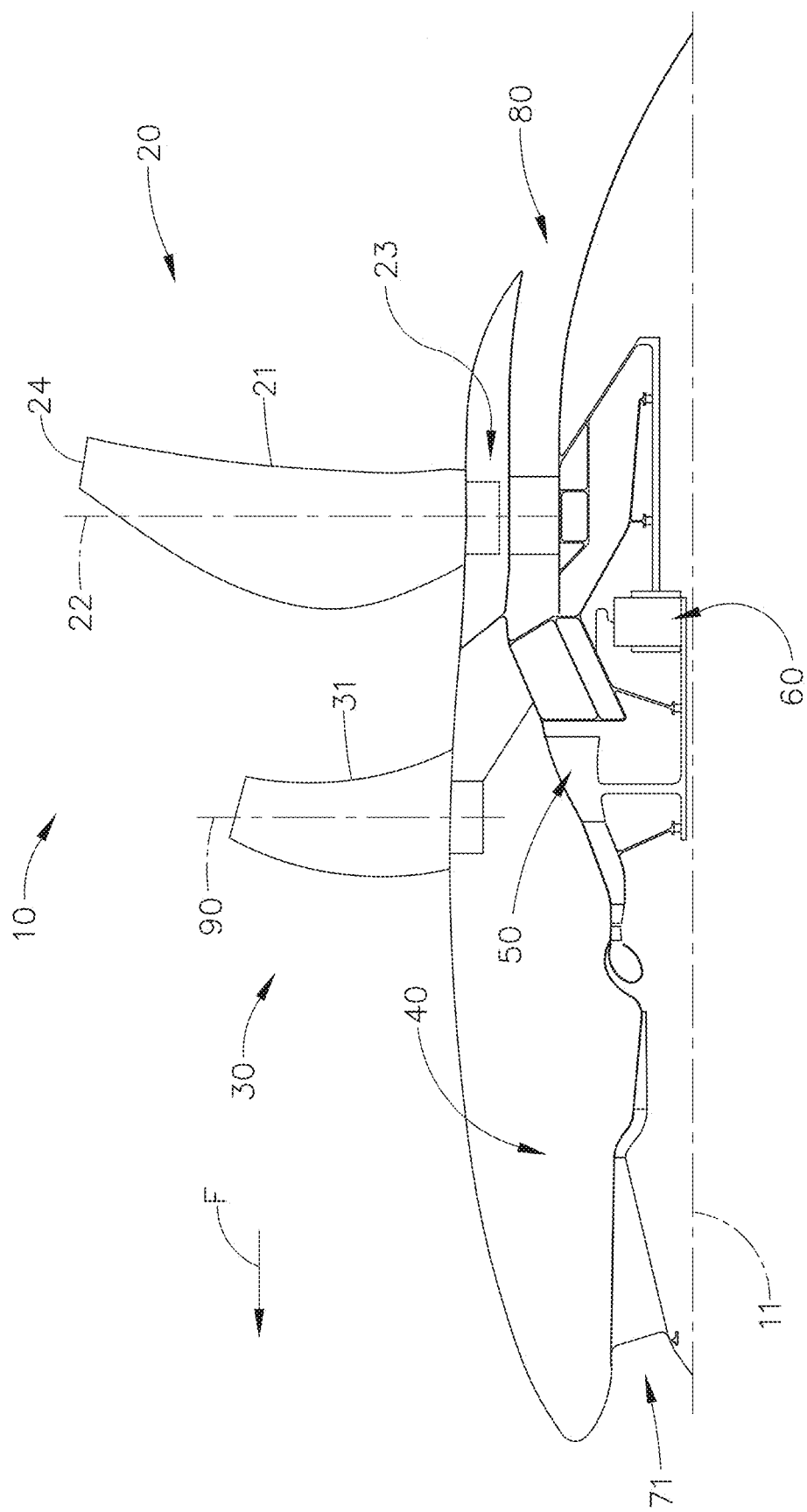
FIG. 6 is a cross-sectional schematic illustration of another exemplary embodiment of an unducted thrust producing system.

FIGS. 1 and 5 both illustrate what may be termed a "puller" configuration where the thrust-generating rotating element 20 is located forward of the gas generator 40. FIG. 6 on the other hand illustrates what may be termed a "pusher" configuration embodiment where the gas generator 40 is located forward of the rotating element 20. As with the embodiment of FIG. 5, the inlet 71 is located forward of both the rotating element 20 and the stationary element 30 and radially inwardly of the rotating element 20. The exhaust 80 is located inwardly of and aft of both the rotating element 20 and the stationary element 30. The system depicted in FIG. 6 also illustrates a configuration in which the stationary element 30 is located forward of the rotating element 20.

The selection of "puller" or "pusher" configurations may be made in concert with the selection of mounting orientations with respect to the airframe of the intended aircraft application, and some may be structurally or operationally advantageous depending upon whether the mounting location and orientation are wing-mounted, fuselage-mounted, or tail-mounted configurations.

Figure 7:
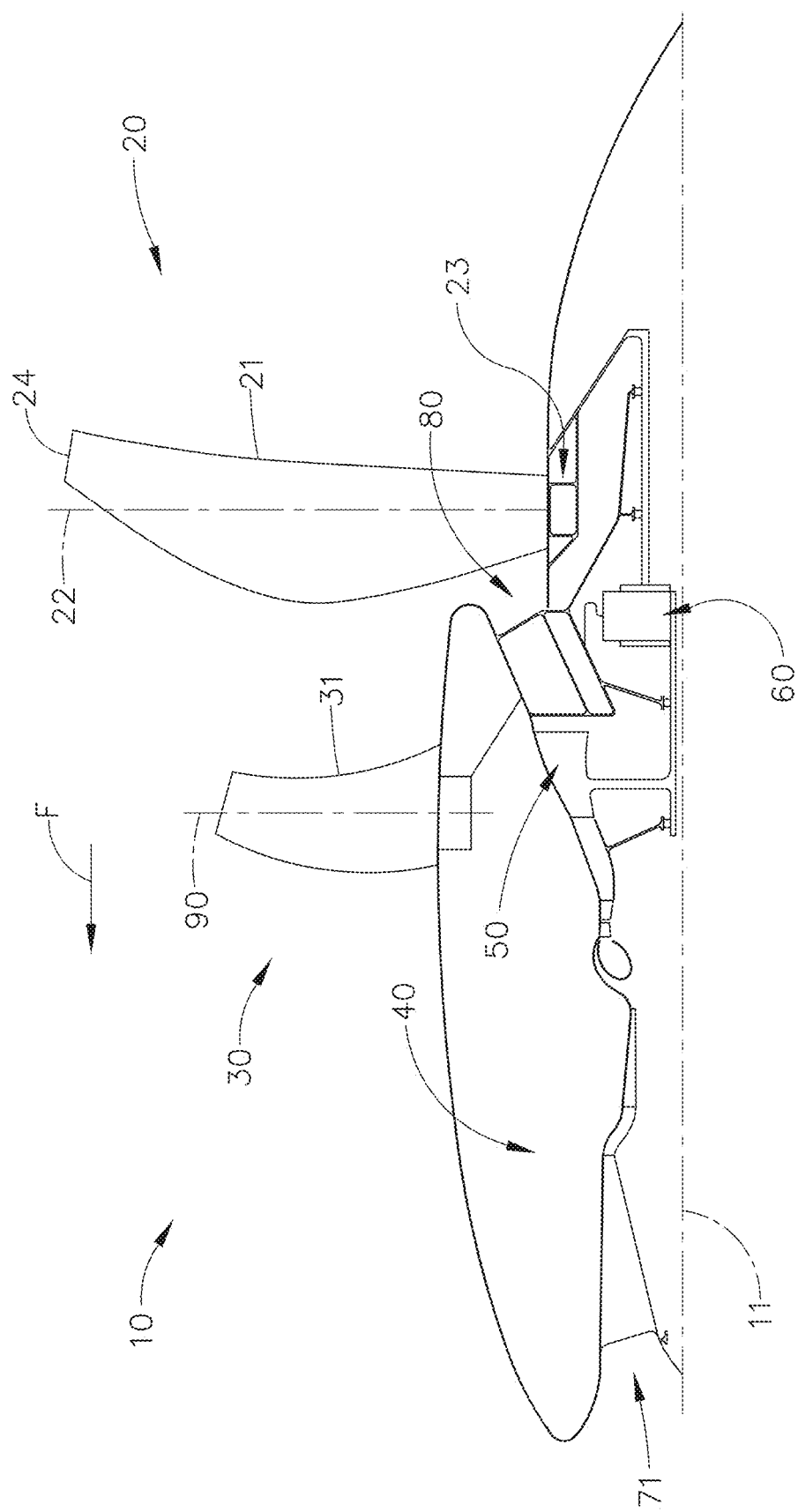
FIG. 7 is a cross-sectional schematic illustration of another exemplary embodiment of an unducted thrust producing system.
Figure 8:
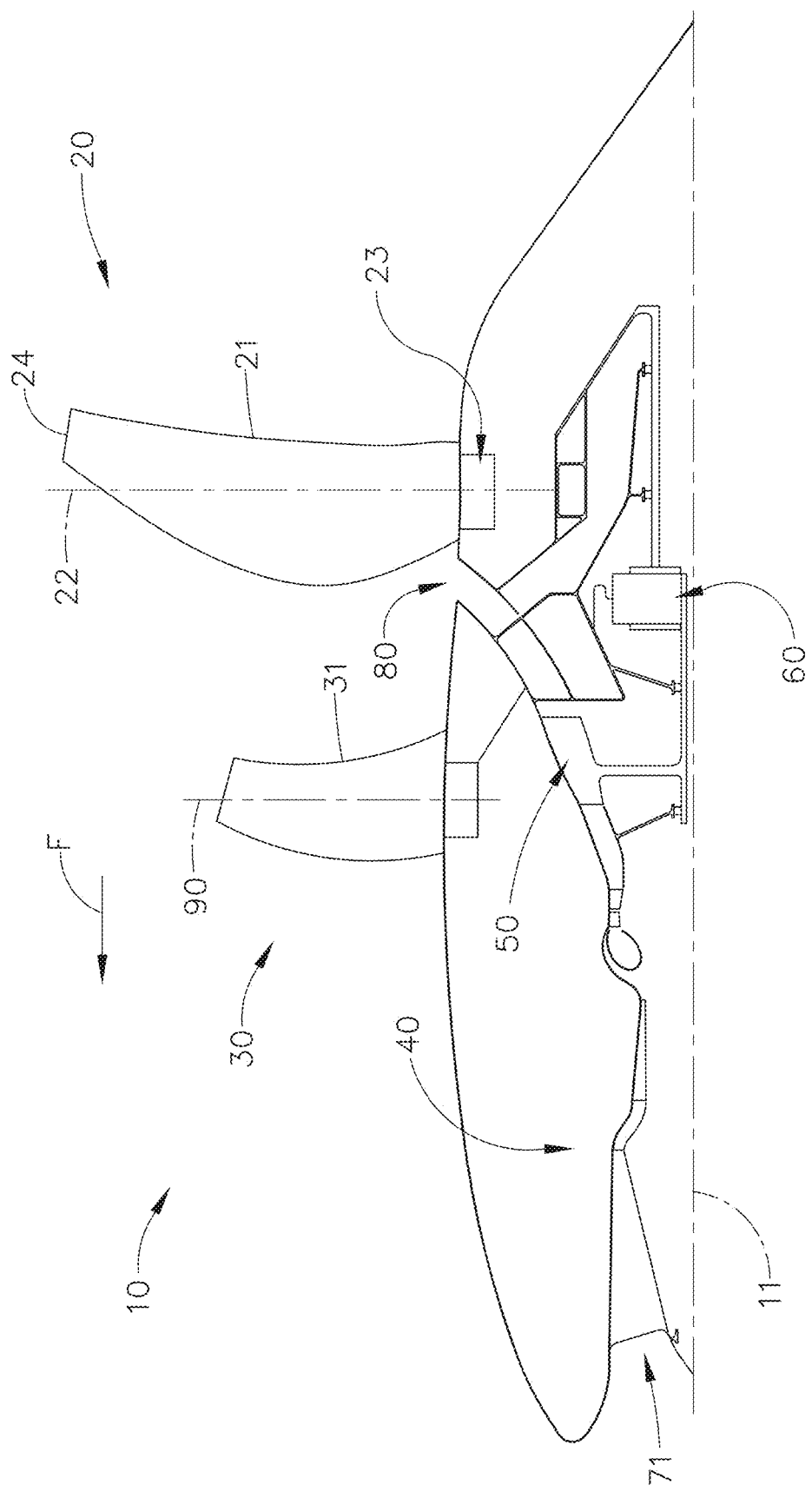
FIG. 8 is a cross-sectional schematic illustration of another exemplary embodiment of an unducted thrust producing system.

FIGS. 7 and 8 illustrate "pusher" embodiments similar to FIG. 6 but wherein the exhaust 80 is located between the stationary element 30 and the rotating element 20. While in both of these embodiments the rotating element 20 is located aft of the stationary element 30, FIGS. 7 and 8 differ from one another in that the rotating element 20 of FIG. 7 incorporates comparatively longer blades than the embodiment of FIG. 8, such that the root 23 of the blades of FIG. 7 is recessed below the airstream trailing aft from the stationary element 30 and the exhaust from the gas generator 40 is directed toward the leading edges of the rotating element 20. In the embodiment of FIG. 8, the rotating element 20 is more nearly comparable in length to the stationary element 30 and the exhaust 80 is directed more radially outwardly between the rotating element 20 and the stationary element 30.

Figure 9:
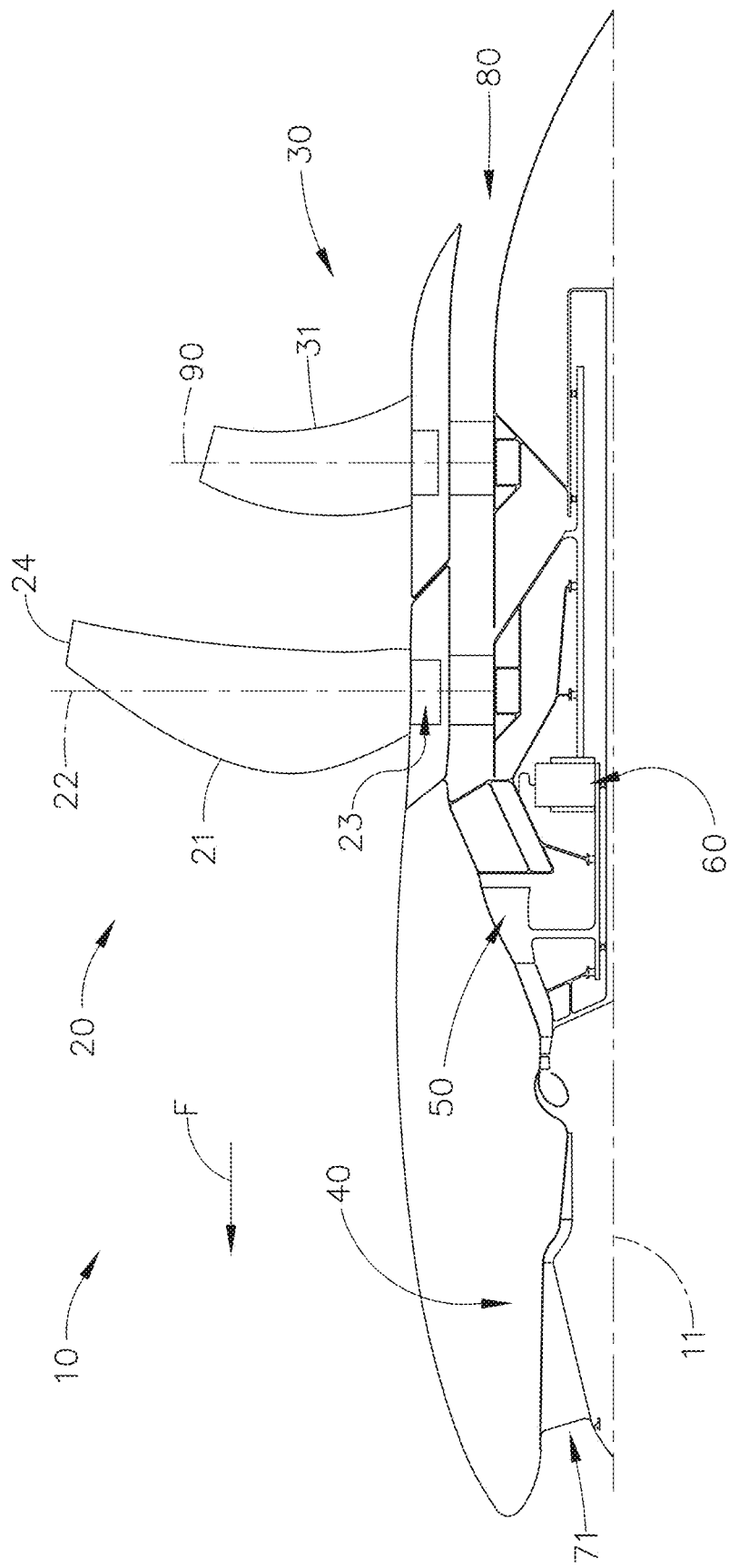
FIG. 9 is a cross-sectional schematic illustration of another exemplary embodiment of an unducted thrust producing system.
Figure 10:
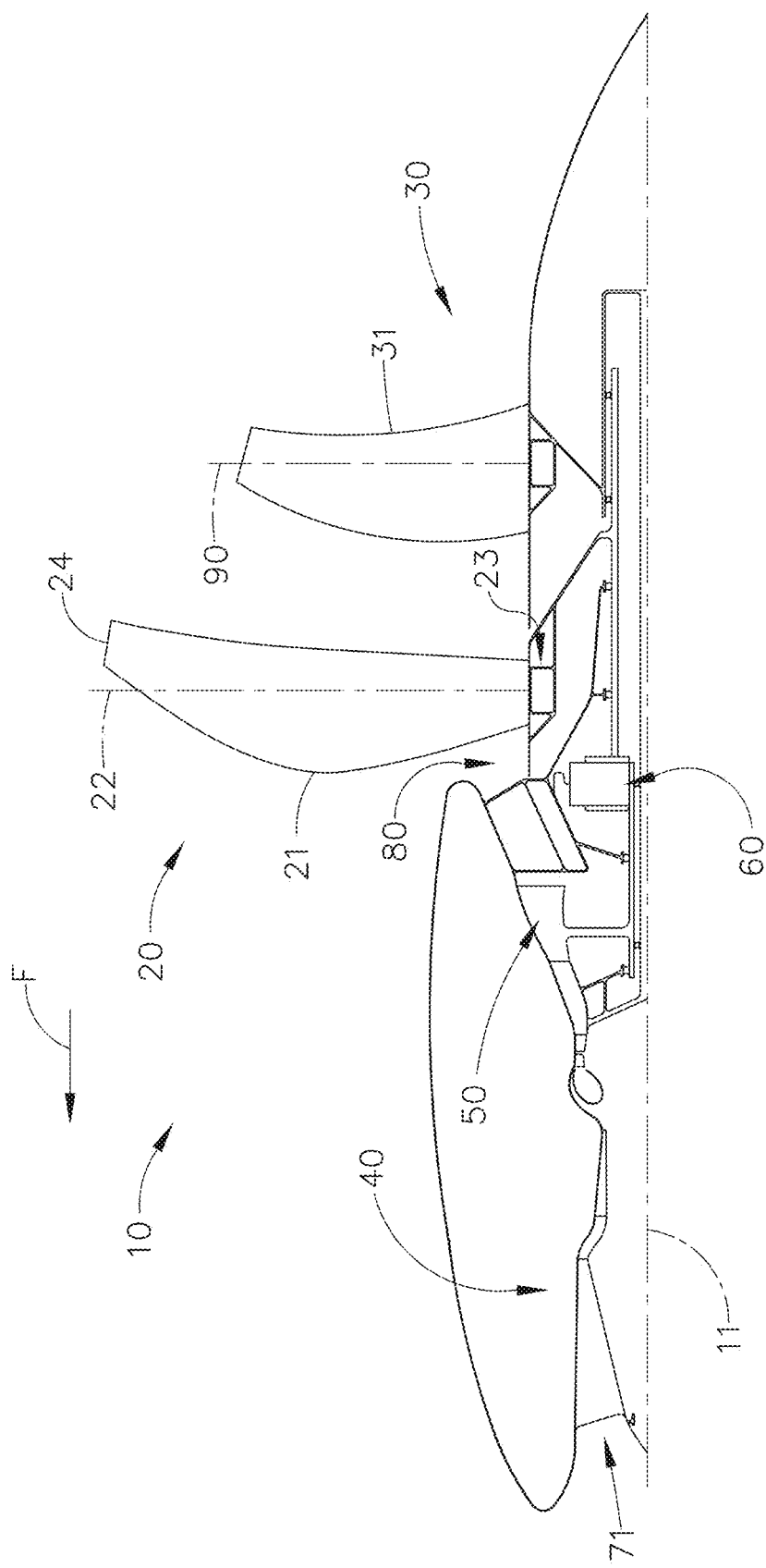
FIG. 10 is a cross-sectional schematic illustration of another exemplary embodiment of an unducted thrust producing system.
Figure 11:
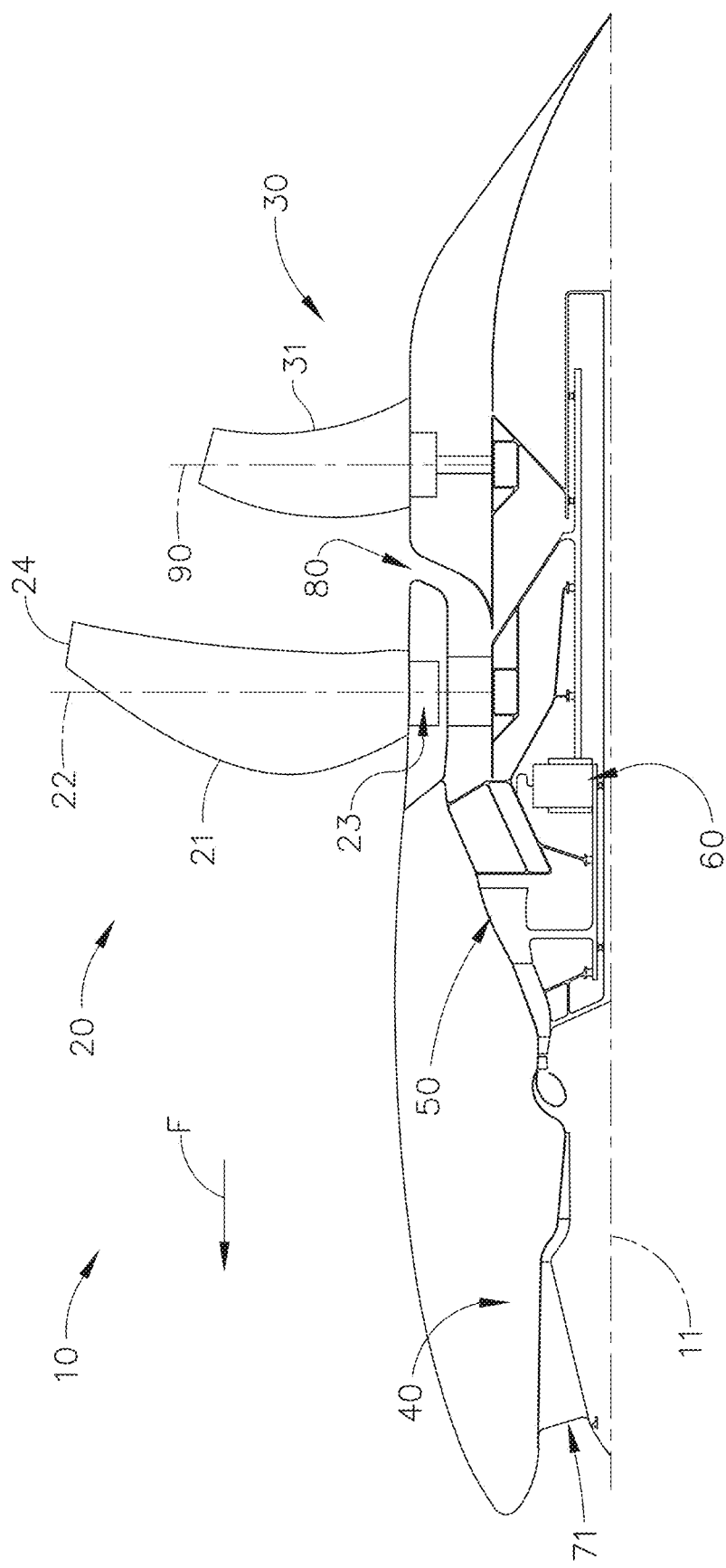
FIG. 11 is a cross-sectional schematic illustration of another exemplary embodiment of an unducted thrust producing system.

FIGS. 9, 10, and 11 depict other exemplary "pusher" configuration embodiments wherein the rotating element 20 is located forward of the stationary element 30, but both elements are aft of the gas generator 40. In the embodiment of FIG. 9, the exhaust 80 is located aft of both the rotating element 20 and the stationary element 30. In the embodiment of FIG. 10, the exhaust 80 is located forward of both the rotating element 20 and the stationary element 30. Finally, in the embodiment of FIG. 11, the exhaust 80 is located between the rotating element 20 and the stationary element 30.

Figure 12:
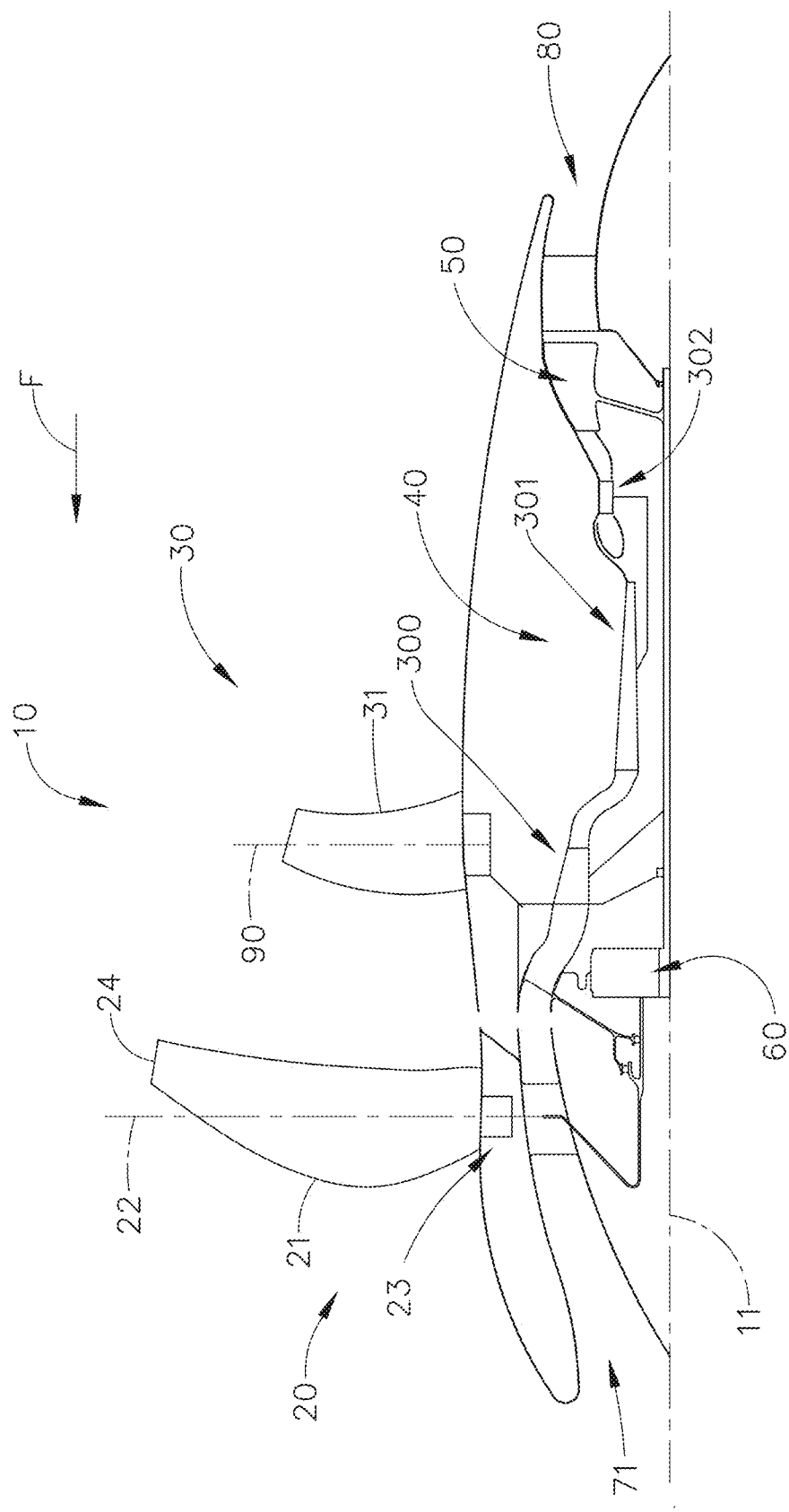
FIG. 12 is a cross-sectional schematic illustration of another exemplary embodiment of an unducted thrust producing system.
Figure 13:
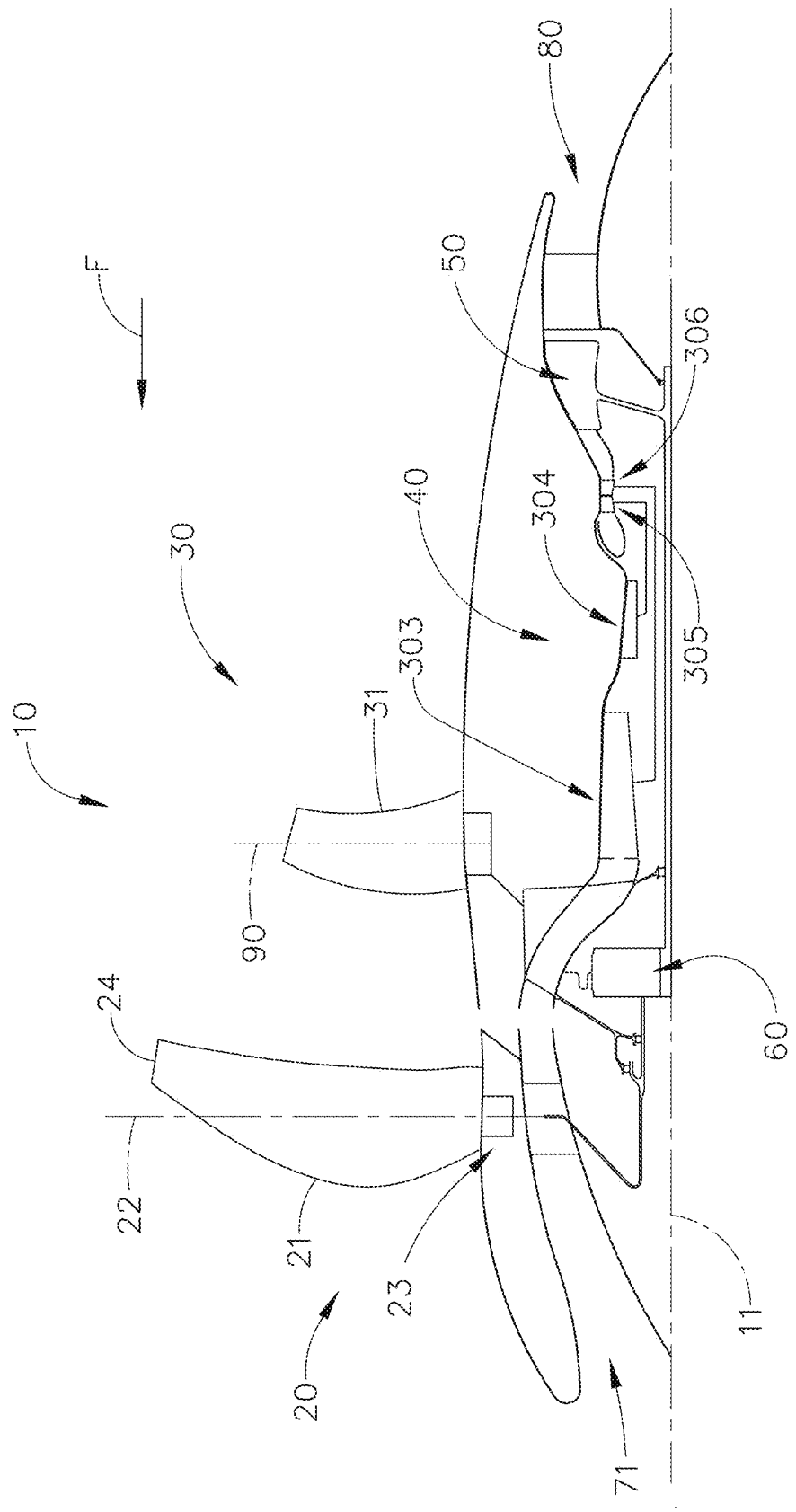
FIG. 13 is a cross-sectional schematic illustration of another exemplary embodiment of an unducted thrust producing system.

FIGS. 12 and 13 show different arrangements of the gas generator 40, the low pressure turbine 50 and the rotating element 20. In FIG. 12, the rotating element 20 and the booster 300 are driven by the low pressure turbine 50 directly coupled with the booster 300 and connected to the rotating element 20 via the speed reduction device 60. The high pressure compressor 301 is driven directly by the high pressure turbine 302. In FIG. 13 the rotating element 20 is driven by the low pressure turbine 50 via the speed reduction device 60, the booster 303 is driven directly by the intermediate pressure turbine 306, and the high pressure compressor 304 is driven by the high pressure turbine 305.

FIG. 15 is a cross-sectional schematic illustration taken along lines 15-15 of FIG. 14 illustrating the inlet configuration of the unducted thrust producing system of FIG. 14 as a non-axisymmetric, non-annular inlet. In the configuration shown, the inlet 70 takes the form of a pair of radially-opposed inlets 72 each feeding into the core.

The gas turbine or internal combustion engine used as a power source may employ an inter-cooling element in the compression process. Similarly, the gas turbine engine may employ a recuperation device downstream of the power turbine.

In various embodiments, the source of power to drive the rotating element 20 may be a gas turbine engine fuelled by jet fuel or liquid natural gas, an electric motor, an internal combustion engine, or any other suitable source of torque and power and may be located in proximity to the rotating element 20 or may be remotely located with a suitably configured transmission such as a distributed power module system.

In addition to configurations suited for use with a conventional aircraft platform intended for horizontal flight, the technology described herein could also be employed for helicopter and tilt rotor applications and other lifting devices, as well as hovering devices.

It may be desirable to utilize the technologies described herein in combination with those described in the co-pending applications listed above.

The foregoing description of the embodiments of the invention is provided for illustrative purposes only and is not intended to limit the scope of the invention as defined in the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An unducted thrust producing system, the unducted thrust producing system comprising:
   a rotating element and a stationary element, wherein the unducted thrust producing system utilizes a single rotating propeller assembly comprising the rotating element;
wherein the rotating element is driven via a speed reduction device to rotate about an axis;
wherein the stationary element is aft of the rotating element of the single rotating propeller assembly;
wherein two or more vanes of the stationary element includes a shroud distally from the axis;
wherein a span of the two or more vanes, including the shroud, is shorter than a span of a blade of the rotating element;
wherein the rotating element has a plurality of blades, and the stationary element has a plurality of vanes configured to impart a change in tangential velocity of air from the rotating element, the change in tangential velocity being opposite to that imparted to the air by the rotating element; and
wherein:
the speed reduction device is located forward of both the rotating element and the stationary element; or
the speed reduction device is located between the rotating element and the stationary element.

2. The unducted thrust producing system of claim 1, wherein at least one of the plurality of vanes is attached to an aircraft structure.

3. The unducted thrust producing system of claim 1, wherein the unducted thrust producing system is a helicopter lift system.

4. The unducted thrust producing system of claim 1, wherein the unducted thrust producing system is a propeller system.

5. The unducted thrust producing system of claim 1, wherein a pitch of at least one of the plurality of blades is variable.

6. The unducted thrust producing system of claim 1, wherein a pitch of at least one of the plurality of vanes is variable.

7. An unducted thrust producing system, the unducted thrust producing system comprising:
a rotating element and a stationary element,
wherein the rotating element is driven via a speed reduction device;
wherein the stationary element is aft of the rotating element;
wherein two or more vanes of the stationary element includes a shroud distally from an axis of the stationary element;
wherein a span of the two or more vanes, including the shroud, is shorter than a span of a blade of the rotating element;
wherein vanes of the stationary element are configured to reduce the degree of swirl of air from the rotating element; and
wherein the speed reduction device is located forward of both the rotating element and the stationary element.

8. The unducted thrust producing system of claim 7, wherein the rotating element has a plurality of blades and the stationary element has a plurality of vanes configured to impart a change in tangential velocity of the air opposite to that imparted by the rotating element.

9. The unducted thrust producing system of claim 7, wherein at least one of the vanes is attached to an aircraft structure.

10. The unducted thrust producing system of claim 7, wherein the unducted thrust producing system is a propeller system.

11. The unducted thrust producing system of claim 1, wherein the rotating element is driven by a gas generator via the speed reduction device; and
wherein the rotating element of the single rotating propeller assembly and the speed reduction device are located between the stationary element and the gas generator.

12. The unducted thrust producing system of claim 1, wherein the shroud comprises a plurality of separated segments that allows the vanes of the stationary element to pitch.

* * * * *